United States Patent [19]

Kortbeek et al.

[11] 4,195,069

[45] Mar. 25, 1980

[54] PREPARATION OF VIOLET TICL$_3$

[75] Inventors: Andras G. Th. G. Kortbeek; Adrianus A. van der Nat; Wilhelmina J. M. van der Linden Lemmers; Willem Sjardijn, all of Amsterdam, Netherlands

[73] Assignee: Shell Oil Company, Houston, Tex.

[21] Appl. No.: 807,696

[22] Filed: Jun. 17, 1977

[30] Foreign Application Priority Data

Jul. 12, 1976 [GB] United Kingdom ............... 28897/76

[51] Int. Cl.$^2$ .............................................. C01G 23/02
[52] U.S. Cl. ............................... 423/492; 252/429 A; 252/429 B; 585/524
[58] Field of Search .................... 423/492; 252/429 A, 252/429 B

[56] References Cited

U.S. PATENT DOCUMENTS

| | | | |
|---|---|---|---|
| 3,466,140 | 9/1969 | Smith | 423/492 |
| 3,558,271 | 1/1971 | Colcagno | 423/492 |
| 3,769,233 | 10/1973 | Hermans et al. | 423/492 |
| 4,060,593 | 11/1977 | Kazuo et al. | 423/492 |
| 4,085,064 | 4/1978 | Wristers | 252/429 B |

OTHER PUBLICATIONS

Kirk-Othmer, "Encyclopedia of Chemical Technology," 2d. Ed. 1969, pp. 385-387 & 392-398.

*Primary Examiner*—Earl C. Thomas

[57] ABSTRACT

A process for the preparation of violet TiCl$_3$ by reducing TiCl$_4$ with an organo-aluminum compound, characterized in that:

(a) the TiCl$_4$ is premixed with a complexing agent in an inert organic solvent, the molar ratio complexing agent:TiCl$_4$ being within the range from 0.3:1 to 2:1;

(b) the organo-aluminum compound is premixed with a complexing agent in an inert organic solvent, the molar ratio complexing agent:organo-aluminum compound being at least 0.25:1;

(c) the reduction to TiCl$_3$ and precipitation of TiCl$_3$ are carried out by combining at least one stoichiometric equivalent of TiCl$_4$ in the premixed composition of step (a) with one stoichiometric equivalent of the organoaluminum compound in the premixed composition of step (b) over a period of less than one hour at a temperature within the range 60° to 110° C.; and (d) the final concentration of violet TiCl$_3$ in the reaction mixture is at least 0.2 mol./liter.

9 Claims, No Drawings

PREPARATION OF VIOLET TICL₃

This invention relates to a process for the preparation of violet TiCl₃ which may be used as a component of a catalyst for the polymerization of olefins, in particular for the stereospecific polymerization of alpha-olefins.

It is well known that titanium tetrachloride (TiCl₄) can be reduced with an organo-aluminum derivative to give brown (beta-) TiCl₃. This form of TiCl₃ is unsuitable for the stereospecific polymerization of alphaolefins to give polymers having a high isotacticity. The brown form is therefore converted to the violet form by means of a heat treatment at a temperature up to 250° C., for example 150° to 200° C. In such preparations it is desirable to maintain the elevated temperature conditions for a sufficient period of time to ensure adequate conversion to the violet form. Violet TiCl₃ may also be prepared directly by reducing TiCl₄ with an alkyl aluminum compound at an elevated temperature, for example 150° to 200° C. Examples of both of these methods of preparation are described in U.K. patent specification 1,152,192 or equivalent U.S. Pat. No. 3,558,271, which deals more specifically with the use of certain ethers as the reaction medium.

It is observed, however, that at the elevated temperatures generally used for these preparations the crystallites of violet TiCl₃ tend to grow in size; this means that the catalytic surface area per gram TiCl₃ and hence the catalytic activity will decrease gradually. The rate of crystallite growth depends on the time and temperature conditions employed, i.e., the longer the exposure and the higher the temperature, the greater will be the reduction in catalytic activity. A general discussion of the relationships between crystallite size, catalytic surface area and catalytic activity of TiCl₃ is given, for example, in Chapter 2 of "Kinetics of Ziegler-Natta Polymerization" by Keii, Kodunsha, Tokyo 1972.

A number of substances have been found to catalyze the conversion of brown to violet TiCl₃ so that the formation of the violet form may be completed more rapidly and/or at lower temperatures. Examples of such substances are organic halides (see published Netherlands patent application 76 06139 or related U.K. Patent Specification 1,484,086) and TiCl₄ (see U.K. patent specification No. 1,337,764 or equivalent U.S. Pat. No. 3,769,233). A particular method of preparing an active form of violet TiCl₃ incorporating a TiCl₄-catalyzed conversion is described in U.K. patent specification No. 1,391,067. In this method brown TiCl₃ is prepared by a low temperature reduction of TiCl₄ with an organoaluminum compound, then washed with a complexing agent and finally converted to the violet form in the presence of TiCl₄, preferably at a temperature between 20° and 120° C.

The published Netherlands patent application 75 09129 or equivalent U.S. Pat. No. 4,060,593 describes an alternative procedure in which the TiCl₃ is completely solubilized by the complexing agent and the violet TiCl₃ is precipitated by heating the solubilized TiCl₃ in the presence of an excess of TiCl₄, preferably at 40° to 120° C.

Both of these processes involve at least two separate basic steps, i.e., a reduction step at ambient temperature or below and a violet TiCl₃ formation step at higher temperatures up to 120° C. The present invention is concerned with a new, simplified process resulting in the direct formation of violet TiCl₃ at lower temperatures than have been used hitherto.

Accordingly, the present invention provides a process for the preparation of violet TiCl₃ by reducing TiCl₄ with an organo-aluminum compound, characterized in that (a) the TiCl₄ is premixed with a complexing agent in an inert organic solvent, the molar ratio complexing agent:TiCl₄ being within the range from 0.3:1 to 2:1;

(b) the organo-aluminum compound is premixed in an inert organic solvent with a complexing agent, the molar ratio complexing agent:organo-aluminum compound being greater than 0.25:1;

(c) the reduction is carried out over a period of less than one hour at a temperature within the range 60° to 110° C.; and (d) the final concentration of violet TiCl₃ in the reaction mixture is at least 0.2 mol./liter.

It is surprisingly found that by carrying out the process of the invention as defined above, TiCl₄ may be reduced directly to violet TiCl₃ at lower temperatures than have hitherto been considered practically feasible. The process therefore combines the convenience of a single step process with the improved catalytic activities which stem from the use of a lower temperature for the formation of violet TiCl₃. A further advantage of the process of the invention is that it enables the preparation of violet TiCl₃ with very good stereospecific properties in polymerizations of alpha-olefins.

An essential requirement of the process of the invention is that both the TiCl₄ and the organo-aluminum compound should be premixed with certain defined amounts of the complexing agents. If one or other of the reactants is not so premixed then brown TiCl₃ is formed instead, even when the other conditions used are according to the invention. Furthermore, once the brown form has been produced in this way it does not appear possible to convert it to the violet form, for example, in the presence of excess TiCl₄. This appears to provide support for the view that the violet TiCl₃ is produced in one step by the process of the invention and not via the intermediate formation of brown TiCl₃.

The term "complexing agent" as used herein means a compound capable of forming a complex with titanium and/or aluminum atoms. The complexing agent contains one or more atoms or groups which have one or more free electron pairs which will produce co-ordination with the metal. Atoms having one or more free electron pairs include the atoms of non-metals of groups 5a and 6a of the Periodic Table, for example, oxygen, sulphur, nitrogen, phosphorus, antimony and arsenic. Examples of compounds containing such atoms are ethers, thioethers, thiols, phosphines, stibines, arsines, amines, amides, ketones and esters.

Preferably the complexing agent is a compound of one of the following general formulae:

R'—O—R", R'—S—R",
R'—SH, R'R"R'"N,
R'R"NH and R'—NH₂, in which each of the groups R', R" and R'" is an alkyl, aryl, arylalkyl, alkylaryl or cycloalkyl group of up to 15 carbon atoms.

Particularly preferred complexing agents are dialkyl ethers of the general formula R'—O—R' in which each R' group is an alkyl group of 2 to 8 carbon atoms, for example n-butyl.

The complexing agent with which the TiCl₄ is premixed may be the same as or different from that with which the organo-aluminum compound is premixed. The preferred range for the molar ratio complexing agent:TiCl₄ is from 0.5:1 to 1.5:1, in particular from 0.7:1 to 1.5:1. The preferred range for the molar ratio complexing agent:organo-aluminum compound is from 0.5:1 to 1.5:1, with the use of equimolar portions of the two components being particularly preferred.

The organo-aluminum compound is preferably an aluminum alkyl derivative of empirical formula:

$$AlR_nX_{3-n}$$

in which R is an alkyl group of 2 to 12, preferably 2 to 6 carbon atoms, for example ethyl; X is a hydrogen atom or halogen, preferably chlorine, atom; and n has a value from 0.1 to 3, preferably from 1.5 to 3. Particularly preferred aluminum alkyl derivatives are triethylaluminum and the diethylaluminum chloride.

The relative amounts of TiCl₄ and the organo-aluminum compound used are preferably such that substantially all of the latter is consumed during the reduction. In the case of a trialkylaluminum derivative this means that the molar ratio TiCl₄:aluminum compound is preferably at least the stoichiometric ratio of 3:1. A relatively small excess of TiCl₄ may also be used, for example up to 100% molar excess over the stoichiometric amount required. However, a large excess of TiCl₄, for example a 500% molar excess, is not only unnecessary and wasteful, but in some cases may unexpectedly give rise to the formation of brown TiCl₃ instead of the violet form. This latter phenomenon is surprising in view of the known influence of TiCl₄ on the brown to violet conversion.

The inert organic solvent may comprise an optionally halogenated aliphatic, alicyclic and/or aromatic hydrocarbon. Preferred aliphatic or alicyclic solvents are optionally chlorinated alkanes or cyclo-alkanes of up to 12 carbon atoms. Preferred aromatic solvents are optionally alkylated benzene derivatives, in particular toluene or xylene. In one preferred embodiment of the invention the TiCl₄ is premixed in an aromatic hydrocarbon and the organo-aluminum compound is premixed in an aliphatic hydrocarbon. In this case the relative amounts of the two solvents appear to influence the size and morphology of the TiCl₃ particles.

The concentrations of TiCl₄ and organo-aluminum compound respectively in the starting solutions may vary within wide limits provided these are chosen to give a final TiCl₃ concentration of at least 0.2 mol./liter, preferably from 0.3 to 1.0 mol./liter.

As mentioned above the reduction is carried out over a period of less than one hour. The reduction period is determined by the time taken to add one reactant solution completely to the other. This addition time may be varied widely within the required range, for example from 1 to 45 minutes. It is found in practice that it is convenient to add the solution of the organo-aluminum derivative to the TiCl₄ solution, the so-called forward addition, although equally satisfactory results may be obtained by the reverse addition.

It is surprising that the preparation of the violet TiCl₃ by the process of the invention involves the use of relatively short addition times and that longer addition times give the brown form. A slow forward addition, for example, would give a longer period of relatively high TiCl₄ concentration, and such a situation would be expected to favor the formation of solid violet TiCl₃.

The temperature of the reduction is between 60° and 110° C. Preferred temperatures are from 70° to 90° C. Although very short addition/reduction times may be used at these temperatures to obtain active violet TiCl₃, it is found that the stereospecific properties of the violet TiCl₃ may be improved by maintaining the violet TiCl₃ at the reduction temperature after the reduction has been completed. This aftertreatment may be carried out over a period of 10 to 60 minutes.

The violet TiCl₃ is separated from the liquid reaction mixture, for example, by decantation or filtration, and may then be washed with an aliphatic, alicyclic and/or aromatic hydrocarbon.

The violet TiCl₃ may be stabilized against deterioration of its catalytic activity by, for example, washing with an aluminum alkyl compound such as diethyl aluminum chloride, by storing at a temperature below 0° C., and/or by a prepolymerization as described below.

As mentioned above the invention includes a process for the polymerization of olefins in which the violet TiCl₃ prepared according to the invention is used as catalyst together with an aluminum alkyl derivative, for example a trialkyl aluminum or a dialkylaluminum halide, as an activator. The activator is preferably diethylaluminum chloride. The molar ratio of the aluminum compound to TiCl₃ may be from 0.5:1 to 10:1, preferably from 2:1 to 5:1.

If desired, before the polymerization, the violet TiCl₃ together with some or all of the activator may be prepolymerized with a small amount of the olefin, e.g., 2-20 g per g TiCl₃. The prepolymerization is carried out under relatively mild conditions; for example, with propylene the temperature is preferably below 60° C. and the pressure below 2 bar abs.

The olefins which may be polymerized according to the invention are preferably alpha-olefins of up to 8 carbon atoms, for example, ethylene, propylene, 1-butene or 1-pentene. The invention is of particular interest for the homopolymerization of propylene and the copolymerization of ethylene and propylene.

The polymerization may be carried out using any of the conventional procedures. Thus, the polymerization may be carried out in an inert liquid diluent medium such as an aliphatic hydrocarbon, or, in the absence of a diluent, in the vapor phase or in the liquid olefin monomer. Polymerization temperatures may be from 20° to 90° C., preferably from 55° to 75° C. and pressures from 1 to 50 bar abs. The polymerization may also be carried out in the presence of substances which lower the molecular weight of the polymer, for example gaseous hydrogen, or substances which decrease the soluble (nonstereospecific) polymer content of the polymer, for example amine or phosphine derivatives.

The invention is illustrated further in the following Examples.

EXAMPLES I–XXXIX

(a) Preparation of violet TiCl₃

The same basic method was used in all of these Examples. Titanium tetrachloride was dissolved in the organic solvent and to the stirred solution was added an ether-complexing agent. The mixture was warmed to the desired reduction temperature and then a mixture of an aluminum alkyl and an ether-complexing agent in an organic solvent was added over a period which was not more than 1 hour. In all but one Example the reaction mixture was stirred for a further period at the reduction temperature (after treatment), and then cooled to 25° C. The violet $TiCl_3$ was then filtered off, washed with isooctane and dried. The precise reaction conditions used in each Example are summarized in the following Table, in which the following abbreviations are used.

IO = iso-octane; DBE = di-n-butyl ether;
DDE = di-n-dodecyl ether; DEE = diethyl ether (b) Polymerization The violet $TiCl_3$ thus obtained was tested in homo-polymerizations of propylene at 70° C. in the presence of 0.6%v hydrogen. Aluminum diethyl chloride (9 mmol.) was added to iso-octane (1.5 l) at 70° C. in a 3 liter reactor, and to this mixture was added the $TiCl_3$ (1.7 mmol.). The reactor was then pressurized with propylene to 2.6 bar abs. The reactor was maintained at 70° C. for 4 hours and then the pressure was released. Butanol was added to inactivate the catalyst and the polymer was washed first with 1% aqueous hydrochloric acid and then three times with water. The polymer suspension was then steam-distilled and the polymer was filtered off. The results of the polymerization experiment are also summarized in the following Table. The activity of the violet $TiCl_3$ is expressed as grams polymer per gram $TiCl_3$ per hour per bar of propylene.

The value of the xylene solubles is in each case the total amount of polymer which is soluble in xylene and represents the total amount of atactic material produced.

COMPARATIVE EXAMPLES A-L (a) Preparation of $TiCl_3$

In each of these examples, the $TiCl_3$ was prepared by the general procedure described above with modifications which caused the preparation not to be according to the invention. These modifications, as evident from the data in the following Table, are summarized as follows: In Comparative Examples A-E no complexing agent was present in one or both of the catalyst components; in Comparative Examples F and G the molar ratios of complexing agent to $TiCl_4$ are outside the effective range at 0.19:1 and 0.27:1, respectively; in Comparative Examples H, J and K, the addition time was a full hour or more; in Comparative Example L, the preparation was carried out in a large amount of the ether as solvent.

(b) Polymerization

The method of carrying out polymerization in the Comparative Examples was the same as described above.

TABLE

| | $TiCl_4$ Solution | | | Al.alkyl solution | | | Temp (°C.) | Addition time (min) | After treatment (min) | Properties $TiCl_3$ | | Properties Polymer | |
|---|---|---|---|---|---|---|---|---|---|---|---|---|---|
| Example | $TiCl_4$ (mmol) | ether (mmol) | solvent (ml) | Al.alkyl (mmol) | ether (mmol) | solvent (ml) | | | | Color | Activity | Xylene sol. (%) | Bulk density (g/ml) |
| I | 75 | DBE 50 | toluene 75 | $AlEt_2Cl$ 19 | DBE 19 | IO 13 | 90 | 7 | 20 | violet | 119 | 3.3 | — |
| Comparative A | 75 | DBE 50 | toluene 75 | $AlEt_2Cl$ 19 | none | IO 13 | 90 | 7 | 20 | brown | 2 | high | — |
| II | 75 | DBE 50 | toluene 75 | $AlEt_3$ 12.5 | DBE 12.5 | IO 13 | 90 | 3 | 20 | violet | 120 | 6.0 | 0.34 |
| III | 75 | DBE 50 | toluene 75 | $AlEt_3$ 12.5 | DBE 12.5 | IO 13 | 90 | 3 | none quenched to 0° C. | violet | 130 | 10.0 | 0.39 |
| IV | 75 | DBE 75 | toluene 75 | $AlEt_3$ 12.5 | DBE 12.5 | IO 13 | 90 | 4 | 20 | violet | 96 | 3.3 | 0.24 |
| V | 75 | DBE 50 | toluene 37.5 | $AlEt_3$ 12.5 | DBE 12.5 | IO 13 | 90 | 3 | 20 | violet | 143 | 3.8 | 0.28 |
| Comparative B | 75 | DBE 50 | toluene 75 | $AlEt_3$ 12.5 | none | IO 13 | 90 | 3 | 20 | brown | 9 | high | — |
| C | 75 | DBE 62.5 | toluene 75 | $AlEt_3$ 12.5 | none | IO 13 | 90 | 3 | 20 | brown | — | — | — |
| D | 75 | DBE 87.5 | toluene 75 | $AlEt_3$ 12.5 | none | IO 13 | 90 | 3 | 20 | brown | 10 | high | — |
| E | 75 | none | toluene 75 | $AlEt_3$ 12.5 | DBE 12.5 | IO 13 | 90 | 3 | 20 | brown | v. low | high | — |
| VI | 75 | DBE 50 | toluene 37.5 | $AlEt_3$ 12.5 | DBE 12.5 | IO 13 | 70 | 3.5 | 20 | violet | 144 | 7.8 | — |
| VII | 75 | DBE 50 | toluene 75 | $AlEt_3$ 12.5 | DBE 12.5 | IO 13 | 70 | 3 | 30 | violet | 133 | 10.2 | 0.38 |
| Comparative F | 262.5 | DBE 50 | toluene 75 | $AlEt_3$ 12.5 | DBE 12.5 | IO 13 | 70 | 5 | 20 | brown | 10 | high | — |
| VIII | 75 | DBE 50 | toluene 75 | $AlEt_3$ 12.5 | DBE 12.5 | IO 13 | 80 | 5 | 20 | violet | 143 | 7.5 | 0.39 |
| IX | 75* | DBE 50 | toluene 75 | $AlEt_3$ 12.5 | DBE 12.5 | IO 13 | 80 | 3 | 20 | violet | 132 | 5.5 | 0.39 |
| X | 75 | DBE 50 | toluene 112 | $AlEt_3$ 12.5 | DBE 12.5 | IO 13 | 90 | 3 | 20 | violet/brown | 89 | 7.7 | 0.22 |
| XI | 75 | DBE 50 | toluene 75 | $AlEt_3$ 12.5 | DBE 12.5 | IO 13 | 100 | 5 | 20 | violet/brown | 53 | 7.2 | — |
| XII | 75 | DEE 50 | toluene 75 | $AlEt_3$ 12.5 | DBE 12.5 | IO 13 | 90 | 5 | 20 | violet | 87 | 6.6 | — |
| XIII | 75 | DBE 50 | toluene 75 | $AlEt_3$ 12.5 | DEE 12.5 | IO 13 | 90 | 10 | 20 | violet | 37 | 5.7 | — |
| XIV | 37.5 | DBE 50 | toluene 75 | $AlEt_3$ 12.5 | DBE 12.5 | IO 13 | 90 | 4 | 20 | violet | 163** | 13.2 | 0.32 |
| XV | 37.5 | DBE 50 | toluene 75 | $AlEt_3$ 12.5 | DBE 12.5 | IO 13 | 90 | 3 | 20 | violet/ | 134 | 14.1 | — |

4,195,069

TABLE -continued

| Example | TiCl4 Solution TiCl4 (mmol) | ether (mmol) | solvent (ml) | Al.alkyl solution Al.alkyl (mmol) | ether (mmol) | solvent (ml) | Temp (°C.) | Addition time (min) | After treatment (min) | Properties TiCl3 Color | Activity | Properties Polymer Xylene sol. (%) | Bulk density (g/ml) |
|---|---|---|---|---|---|---|---|---|---|---|---|---|---|
| XVI | 37.5 | DBE 37.5 | toluene 75 | AlEt3 12.5 | DBE 12.5 | IO 13 | 90 | 4 | 20 | brown violet/ brown | 91 | 14.0 | 0.38 |
| Comparative G | 37.5 | DBE 25 | toluene 37.5 | AlEt3 12.5 | DBE 12.5 | IO 13 | 90 | 5 | 20 | brown | 8 | 59.5 | — |
| XVII | 75 | DBE 10 | toluene 75 | AlEt3 12.5 | DBE 12.5 | IO 13 | 90 | 3 | 20 | violet | 161** | 5.4 | — |
| XVIII | 75 | DBE 50 | IO 37.5 toluene 37.5 | AlEt3 12.5 | DBE 12.5 | IO 13 | 90 | 3 | 20 | violet | 124 | 5.6 | — |
| XIX | 225 | DBE 125 | toluene 225 | AlEt3 31.25 | DBE 31.25 | toluene 33 | 70 | 18 | 16 | violet/ brown | 99 | 6.2 | 0.17 |
| XX | 225 | DBE 125 | toluene 225 | AlEt3 31.25 | DBE 31.25 | toluene 33 | 70 | 18 | 35 | violet | 92 | 3.0 | — |
| XXI | 225 | DBE 125 | toluene 225 | AlEt3 31.25 | DBE 31.25 | toluene 33 | 70 | 18 | 57 | violet | 108 | 3.0 | 0.28 |
| XXII | 200 | DBE 134 | toluene 200 | AlEt3 33.4 | DBE 33.4 | IO 35 | 80 | 3 | 20 | violet | 133 | 3.0 | 0.18 |
| XXIII | 200 | DBE 134 | toluene 200 | AlEt3 33.4 | DBE 33.4 | IO 41.5 | 80 | 3 | 20 | violet | 101 | 2.4 | 0.17 |
| XXIV | 200 | DBE 134 | toluene 200 | AlEt3 33.4 | DBE 33.4 | IO 52 | 80 | 3 | 20 | violet | 123 | 3.7 | 0.34 |
| XXV | 200 | DBE 134 | toluene 200 | AlEt3 33.4 | DBE 33.4 | IO 72 | 80 | 3 | 20 | violet | 126 | 4.5 | 0.43 |
| XXVI | 400 | DBE 200 | toluene 200 | AlEt3 67 | DBE 67 | IO 72 | 70 | 3 | 20 | violet | 108 | 5.2 | 0.37 |
| XXVII | 400 | DBE 200 | toluene 200 | AlEt3 67 | DBE 67 | IO 72 | 90 | 6 | 20 | violet | 110 | 2.1 | 0.21 |
| XXVIII | 200 | DBE 134 | toluene 200 | AlEt3 33.4 | DBE 33.4 | toluene 52 | 80 | 20 | 45 | violet | 94 | 2.6 | 0.22 |
| XXIX | 200 | DEE 134 | toluene 165 IO 35 | AlEt3 33.4 | DBE 33.4 | toluene 52 | 80 | 20 | 45 | violet | 140 | 2.0 | 0.19 |
| XXX | 200 | DBE 134 | toluene 156 IO 44 | AlEt3 33.4 | DBE 33.4 | toluene 52 | 80 | 20 | 45 | violet | 121 | 3.2 | 0.23 |
| XXXI | 200 | DBE 134 | toluene 148 IO 52 | AlEt3 33.4 | DBE 33.4 | toluene 52 | 80 | 20 | 45 | violet | 125 | 3.1 | 0.43 |
| XXXII | 200 | DBE 133 | toluene 165 cyclo- hexane 35 | AlEt3 33.3 | DBE 33.3 | toluene 43 cyclo- hexane 9 | 80 | 1.7 | 45 | violet | 100 | 3.1 | 0.40 |
| XXXIII | 200 | DBE 134 | xylene 200 | AlEt3 33.4 | DBE 33.4 | IO 35 | 80 | 20 | 45 | violet | 142 | 2.6 | 0.22 |
| XXXIV | 400 | DBE 200 | toluene 287 | AlEt3 67 | DBE 67 | IO 57 | 86 | 10 | 60 | violet | 116 | 2.0 | — |
| XXXV | 400 | DBE 328 | toluene 144 | AlEt3 67 | DBE 67 | IO 29 | 90 | 40 | 60 | violet | 67 | — | — |
| Comparative H | 400 | DBE 328 | toluene 144 | AlEt3 67 | DBE 67 | IO 29 | 80 | 60 | 150 | brown | 10 | — | — |
| XXXVI | 200 | DBE 133 | toluene 200 | AlEt3 33.3 | DBE 33.3 | IO 35 | 80 | 30 | 45 | violet | 100 | 1.7 | 0.21 |
| XXXVII | 200 | DBE 133 | toluene 200 | AlEt3 33.3 | DBE 33.3 | IO 35 | 80 | 45 | 45 | violet | 74 | 1.6 | 0.21 |
| Comparative J | 200 | DBE 133 | toluene 200 | AlEt3 33.3 | DBE 33.3 | IO 35 | 80 | 60 | 45 | brown | — | — | — |
| K | 200 | DBE 133 | toluene 200 | AlEt3 33.3 | DBE 33.3 | IO 35 | 80 | 120 | 180 | brown | 25 | high | — |
| Comparative L | 32.7 | — | DBE 250 | AlEt2Cl 77 | — | DBE 230 | 128 | 30 | 30 | brown | v. low | high | — |
| XXXVIII | 200 | DBE 133 | toluene 165 | AlEt3 33.3 | DBE 25.1 | IO 35 | 80 | 20 | 45 | violet | 125 | 2.9 | 0.22 |
| XXXIX | 200 | DBE 133 | toluene 100 tetra- chloro- ethane 50 | AlEt3 33.3 | DBE 33.3 | IO 52 | 80 | 20 | 45 | violet | 114 | 1.5 | — |

*TiCl4 solution added to AlEt3 solution
**polymerization time 2.5 hours
**polymerization time 2.0 hours

EXAMPLES XL and XLI

The violet TiCl₃ obtained under the conditions of Example XXVII was used as catalyst in a similar propylene polymerization experiment to that described for the previous Examples, the precise conditions being as follows:

| | |
|---|---|
| temperature | 80° C. |
| pressure | 2.7 bar |
| time | 3.0 hours |
| Al : Ti (molar) = | 6:1 |

The results of this experiment are given as Example XL below.

The polymerization was then repeated in the presence of triethylamine, the molar ratio triethylamine:TiCl₃ being 0.1:1. The results (Example XLI) are also given below.

| Example | Activity g/g TiCl₃/hr/bar | Xylene sol. % |
|---|---|---|
| XL | 119 | 4.16 |
| XLI | 111 | 2.27 |

It is clear that the addition of the amine lowers the percentage of atactic material, i.e., improves the stereospecificity of the catalyst, with only a small accompanying reduction in the activity.

Preparation of catalysts according to this invention is effective, as illustrated, when conducted within the preferred limits of conditions. It is also generally effective when conducted near the outer limits of the broadest disclosed ranges, but under those conditions it may result in active, stereoregulating catalyst which is not a pure violet in color, or in less active and less effectively stereoregulating catalysts and, in some cases, in relatively ineffective brown TiCl₃.

We claim:

1. A process for the preparation of violet TiCl₃ by reducing TiCl₄ with an organoaluminum compound which comprises:
   (a) premixing the TiCl₄ with a complexing agent in an inert organic solvent, the molar ratio complexing agent:TiCl₄ being within the range from 0.5:1 to 1.5:1;
   (b) premixing the organoaluminum compound with a complexing agent in an inert organic solvent, the molar ratio complexing agent: organoaluminum compound being within the range from 0.5:1 to 1.5:1;
   (c) carrying out the reduction to TiCl₃ and precipitation of TiCl₃ in a single step by combining at least one stoichiometric equivalent of TiCl₄ in the premixed composition of step (a) with one stoichiometric equivalent of the organoaluminum compound in the premixed composition of step (b) over a period of less than one hour at a temprature within the range 60° to 110° C.; the final concentration of violet TiCl₃ in the reaction mixture being at least 0.2 mol./liter.

2. A process as claimed in claim 1, characterized in that said complexing agent is a dialkyl ether of general formula R'—O—R', in which each R' is an alkyl group of 2 to 8 carbon atoms and said solvents are selected from the group consisting of optionally chlorinated alkanes and cycloalkanes of up to 12 carbon atoms and optionally alkylated benzene derivatives.

3. A process as claimed in claim 1, wherein the organoaluminum compound is an alkyl aluminum compound of empirical formula:

$$AlR_nX_{3-n}$$

in which R is an alkyl group of 2 to 12 carbon atoms, X is a hydrogen or halogen atom, and n has a value from 0.1 to 3; said complexing agent is a dialkyl ether of general formula R'—O—R', in which each R' is an alkyl group of 2 to 8 carbon atoms; and said solvents are selected from the group consisting of alkanes and cycloalkanes of up to 12 carbon atoms and optionally alkylated benzene derivatives.

4. A process as claimed in claim 3, wherein the final TiCl₃ concentration is from 0.3 to 1.0 mol./liter.

5. A process for the preparation of violet TiCl₃ by reducing TiCl₄ with an organoaluminum compound, which comprises:
   (a) premixing the TiCl₄ in an inert organic solvent with a dialkyl ether in which each alkyl group has 2 to 8 carbon atoms, the molar ratio of ether to TiCl₄ being within the range from 0.5:1 to 1.5:1;
   (b) premixing an organoaluminum compound of empirical formula:

$$AlR_nX_{3-n}$$

in which R is an alkyl group of 2 to 12 carbon atoms, X is a hydrogen or halogen atom, and n has a value from 0.1 to 3, in an inert organic solvent with a dialkyl ether in which each alkyl group has 2 to 8 carbon atoms, the molar ratio of ether to organoaluminum compound being within the range from 0.5:1 to 1.5:1:
   (c) carrying out the reduction to TiCl₃ and precipitation of TiCl₃ in a single step by combining from 1 to 2 stoichiometric equivalents of TiCl₄ in the premixed composition of step (a) with one stoichiometric equivalent of the organoaluminum compound in the premixed comositions of step (b) over a period of less than one hour at a temperature within the range 60° to 110° C.; said solvents being selected from the group consisting of alkanes and cycloalkanes of 2 to 12 carbon atoms and optionally alkylated benzene derivatives and the final concentration of violet TiCl₃ in the reaction mixture being at least 0.2 mol./liter.

6. A process as claimed in claim 5, wherein the violet TiCl₃ is maintained at a temperature in the range from 60°–110° C. for 10 to 60 minutes after completion of the step of combining the premixed compositions.

7. A process for the preparation of violet TiCl₃ by reducing TiCl₄ with triethylaluminum or aluminum diethylchloride, which comprises:
   (a) premixing the TiCl₄ in an aromatic hydrocarbon solvent with di-n-butyl ether, the molar ratio of ether to TiCl₄ being within the range from 0.5:1 to 1.5:1;
   (b) premixing the triethylaluminum or aluminum diethylchloride in an aliphatic hydrocarbon solvent with di-n-butyl ether, the molar ratio of ether to aluminum compound being within the range from 0.5:1 to 1.5:1;
   (c) carrying out the reduction to TiCl₃ and precipitation of TiCl₃ in a single step by combining from 1 to 2 stoichiometric equivalents of TiCl₄ in the premixed composition of step (a) with one stoiciometric equivalent of the organoaluminum compound in the premixed composition of step (b) over a period of 1 to 45 minutes at a temperature within the range 70° to 90° C.; the final concentration of violet $TiCl_3$ in the reaction mixture being within the range of 0.3 to 1.0 mol./liter.

8. A process as claimed in claim 7 wherein said aromatic hydrocarbon solvent is toluene or xylene and said aliphatic hydrocarbon solvent is iso-octane.

9. A process as claimed in claim 7, wherein the violet $TiCl_3$ is maintained at a temperature in the range from 70° to 90° C. for 10 to 60 minutes after completion of the step of combining the premixed compositions.

* * * * *